US012627558B2

(12) United States Patent
Iyer et al.

(10) Patent No.: US 12,627,558 B2
(45) Date of Patent: May 12, 2026

(54) HETEROGENEOUS NETWORK SERVICES USING PLATFORM-AGNOSTIC EXTENSIONS

(71) Applicant: Cisco Technology, Inc., San Jose, CA (US)

(72) Inventors: Jayaraman Iyer, Sunnyvale, CA (US); Zhong Wang, Danville, CA (US); Bhaswati Deka Talukdar, Fremont, CA (US); Pradheep Shrinivasan, Austin, TX (US); Samir Dilipkumar Saklikar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 18/534,526

(22) Filed: Dec. 8, 2023

(65) Prior Publication Data

US 2025/0317350 A1     Oct. 9, 2025

(51) Int. Cl.
H04L 41/0806 (2022.01)
H04L 69/22 (2022.01)

(52) U.S. Cl.
CPC .......... H04L 41/0806 (2013.01); H04L 69/22 (2013.01)

(58) Field of Classification Search
CPC ........................... H04L 41/0806; H04L 69/22
See application file for complete search history.

(56) References Cited

U.S. PATENT DOCUMENTS

| | | | |
|---|---|---|---|
| 8,094,575 B1 | 1/2012 | Vadlakonda et al. | |
| 12,495,078 B1* | 12/2025 | Mritunjai | H04L 63/205 |
| 2011/0252356 A1* | 10/2011 | Morris | G06F 9/451 |
| | | | 715/772 |
| 2017/0208011 A1* | 7/2017 | Bosch | H04L 45/64 |
| 2020/0092201 A1 | 3/2020 | Tillotson et al. | |
| 2020/0403905 A1 | 12/2020 | Allen et al. | |
| 2021/0182040 A1 | 6/2021 | Tiwary et al. | |
| 2021/0342174 A1* | 11/2021 | Bursell | G06F 9/45558 |
| 2022/0075876 A1 | 3/2022 | Rioux et al. | |

(Continued)

OTHER PUBLICATIONS

NPL Custom WebAssembly extensions in OpenShift Service Mesh by Satya et al. (hereafter as NPL Satya) (Year: 2021).*

(Continued)

*Primary Examiner* — Schquita D Goodw
*Assistant Examiner* — Mehulkumar J Shah
(74) *Attorney, Agent, or Firm* — Polsinelli P.C.

(57) ABSTRACT

Disclosed are systems, apparatuses, methods, and computer-readable media for heterogenous network services using platform agnostic extensions. A method includes: instantiating a first service having a first data plane control point; instantiating a second service configured to access the first control point in a data plane; receiving a first packet at the first service in a network path; providing at least one of the first packet and first metadata associated with the first packet to the second service to analyze or process the first packet and the first metadata in conjunction with the first service; processing at least one of the first packet or the first metadata in the second service based on external bytecode and generating at least second metadata based on the processing; receiving second metadata to the first service; and processing the first packet or a second packet.

20 Claims, 10 Drawing Sheets

(56) References Cited

U.S. PATENT DOCUMENTS

2023/0077765 A1*  3/2023  Tillotson ............. H04L 47/2483
                                                709/236
2023/0110131 A1*  4/2023  Smith .................... H04L 69/22
                                                370/254

OTHER PUBLICATIONS

Jayanti, "Custom Webassembly Extensions in Openshift Service Mesh," developers.redhat.com, Dec. 6, 2021, pp. 1-17.

* cited by examiner

600

700

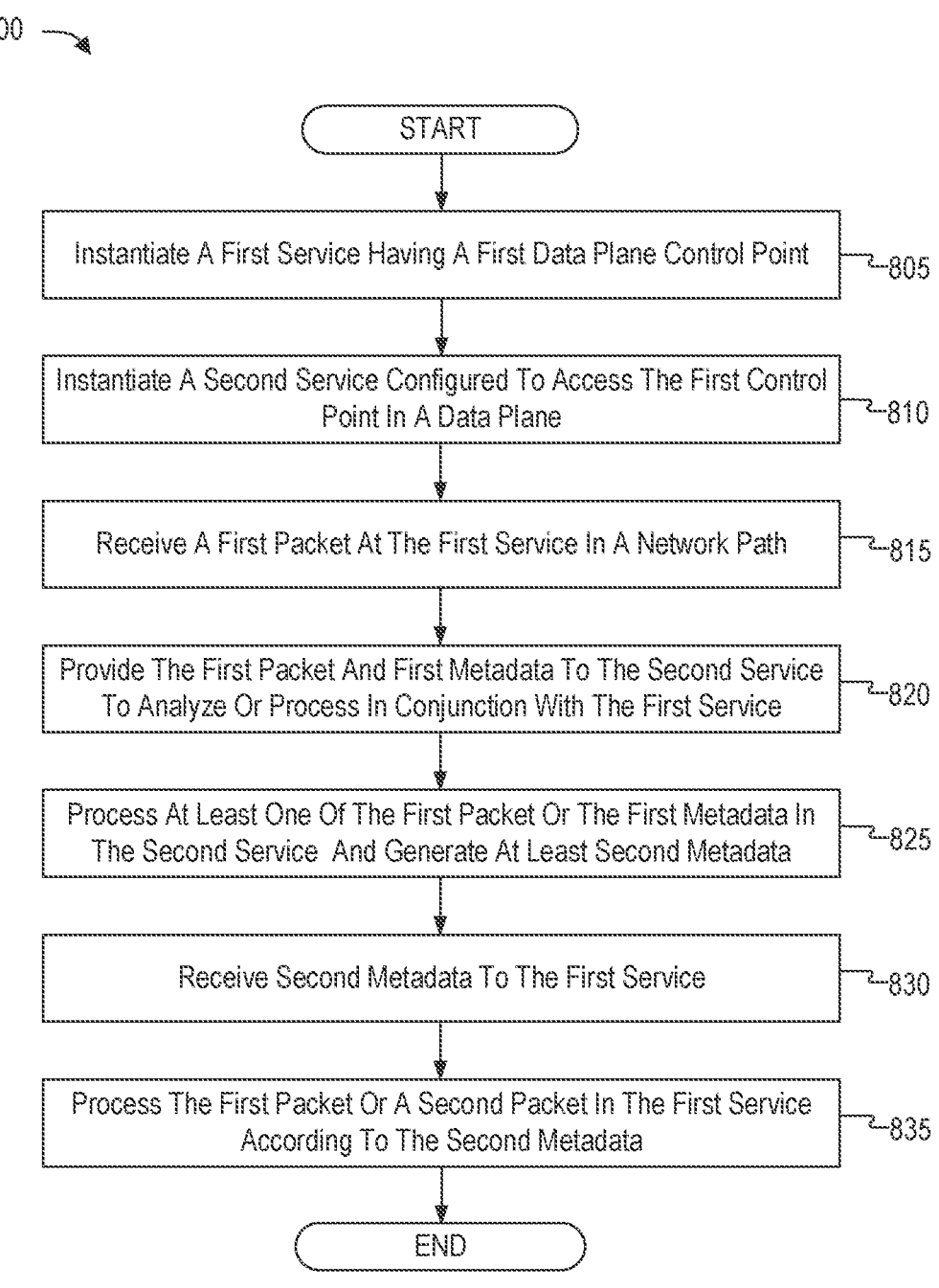

800

START

Instantiate A First Service Having A First Data Plane Control Point ⟿805

Instantiate A Second Service Configured To Access The First Control Point In A Data Plane ⟿810

Receive A First Packet At The First Service In A Network Path ⟿815

Provide The First Packet And First Metadata To The Second Service To Analyze Or Process In Conjunction With The First Service ⟿820

Process At Least One Of The First Packet Or The First Metadata In The Second Service And Generate At Least Second Metadata ⟿825

Receive Second Metadata To The First Service ⟿830

Process The First Packet Or A Second Packet In The First Service According To The Second Metadata ⟿835

END

HETEROGENEOUS NETWORK SERVICES USING PLATFORM-AGNOSTIC EXTENSIONS

TECHNICAL FIELD

The disclosure relates generally to communication networks and, more specifically but not exclusively, to systems and techniques for heterogenous network services using platform-agnostic extensions.

DESCRIPTION OF THE RELATED TECHNOLOGY

Maintaining different network devices in a heterogeneous environment presents several significant challenges for network administrators and IT teams. First and foremost, one of the central difficulties is managing the diversity of device types and manufacturers. In such an environment, there might be a mix of routers, switches, firewalls, load balancers, and other network appliances, each with its own unique operating system, configuration methods, and management tools. This results in a steep learning curve for network administrators who must become proficient in managing a variety of devices, often requiring separate training and expertise for each type. This complexity increases the time required to troubleshoot and maintain the network and increases the likelihood of configuration errors, security vulnerabilities, and inconsistent performance across the network. The complexity also increases security risks.

Different devices may have varying degrees of compatibility with network management and security protocols, making it difficult to establish standardized policies and configurations. As a result, administrators may struggle to maintain a uniform security posture and operational efficiency across the entire network. It becomes an ongoing task to bridge the gap between devices, leading to complexities in ensuring consistent access control, traffic routing, and network performance. This can further expose the network to security risks and increase the potential for operational bottlenecks and outages, as administrators must navigate the intricacies of integrating disparate devices to work together seamlessly.

BRIEF DESCRIPTION OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8 illustrates an example method for implementing heterogeneous network services using platform-agnostic extensions in accordance with some aspects of the disclosure;

DETAILED DESCRIPTION

Figure 1:
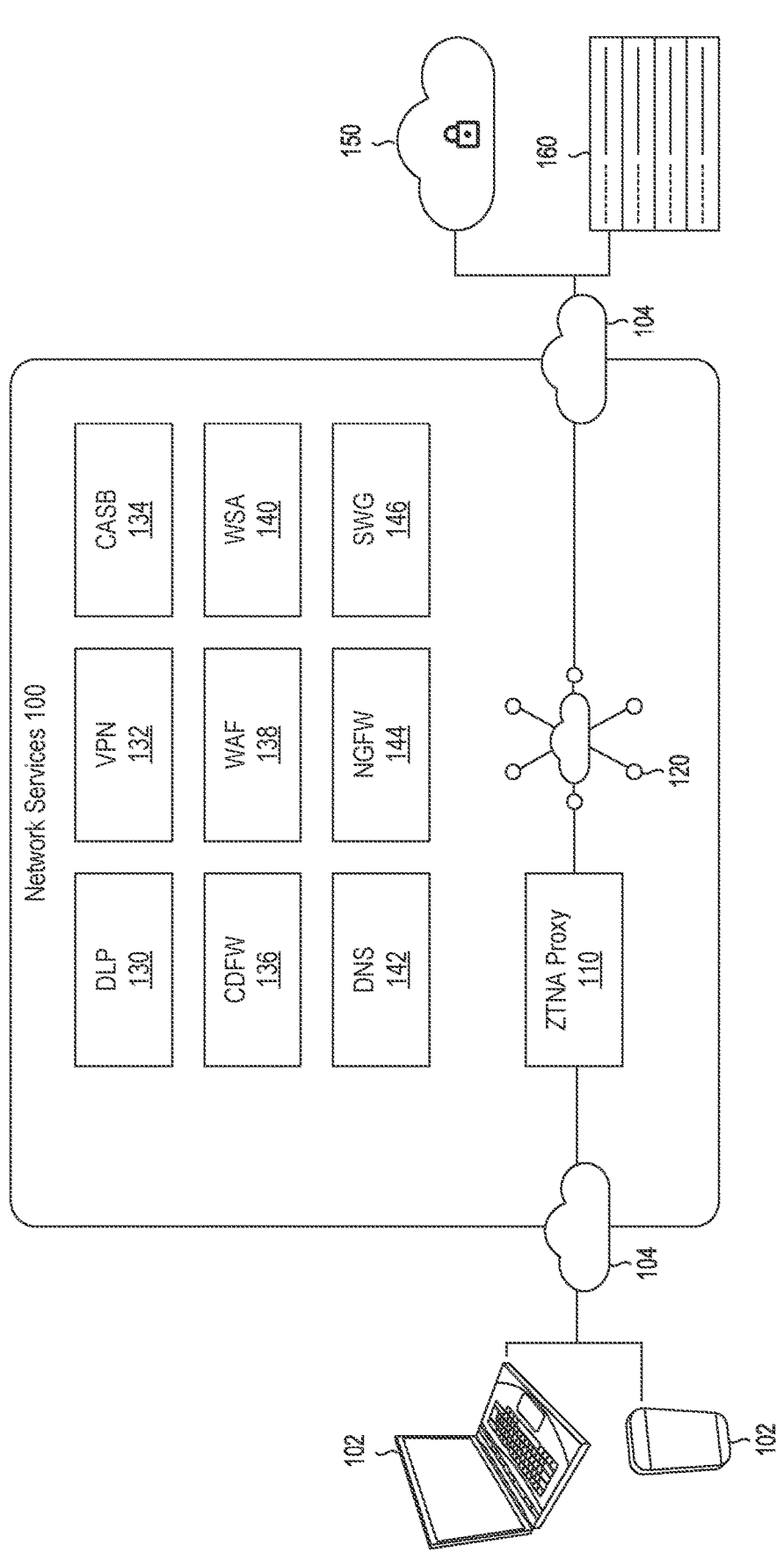
FIG. 1 is a conceptual network diagram that illustrates various services and operations for controlling and monitoring network operations in accordance with some aspects of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Overview

Disclosed are systems, apparatuses, methods, computer readable medium, and circuits for heterogenous network services using WebAssembly extensions. According to at least one example, a method includes: instantiating a first service having a first data plane control point; instantiating a second service configured to access the first control point in a data plane, the second service being provided based on instructions by an external bytecode; receiving a first packet at the first service in a network path; providing at least one of the first packet and first metadata associated with the first packet to the second service to analyze or process the first packet and the first metadata in conjunction with the first service; processing at least one of the first packet or the first metadata in the second service based on external bytecode and generating at least second metadata based on the processing; receiving second metadata to the first service; and processing the first packet or a second packet in the first service according to the second metadata. For example, the communication device instantiates a first service having a first data plane control point; instantiates a second service configured to access the first control point in a data plane, the second service is provided based on instructions by an external bytecode; receives a first packet at the first service in a network path; provides at least one of the first packet and first metadata associated with the first packet to the second service to analyze or process the first packet and the first metadata in conjunction with the first service; processes at least one of the first packet or the first metadata in the second service based on external bytecode and generating at least second metadata based on the processing; receives second metadata to the first service; processes the first packet or a second packet in the first service according to the second metadata.

In another aspect, the method further comprises at least partially processing the first packet in the first service, wherein the first metadata is extracted from the first packet or generated during the processing of the first packet; when a trigger is identified based on the first data plane control point, providing the first packet and the first metadata to the second service; and receiving the second packet from the second service.

In another aspect, the processing of the first packet comprises at least one of dropping the first packet to prevent further transmission of the first packet; inspecting and filtering data within the first packet to generate the second packet; modifying headers within the first packet to generate the second packet; performing a control plane function based on headers or data within the first packet; controlling a session with a counterpart device through a network; controlling at least one network protocol in the data plane; and controlling network routing functions.

In another aspect, the method further comprises instantiating a third service having at least one data plane control point; instantiating a fourth service configured to access a second data plane control point, the fourth service being provided based on instructions by a second external bytecode; receiving the first packet or the second packet from the first service after being processed according to the second metadata; and processing the first packet or the second packet in the third service according to third metadata generated by the fourth service.

In another aspect, a runtime engine is configured to execute the external bytecode and operate as the second service.

In another aspect, the external bytecode comprises webassembly instructions, and the runtime engine comprises or is configured to access a virtual machine for executing the webassembly instructions.

In another aspect, the runtime engine comprises a first interface for controlling network requests associated with the first service, a second interface controlling network protocols associated with the data plane, and a third interface controlling network routing functions In another example, a communication device for processing network packets is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the communication device to: instantiate a first service having a first data plane control point; instantiate a second service configured to access the first control point in a data plane, the second service being provided based on instructions by an external bytecode; receive a first packet at the first service in a network path; provide at least one of the first packet and first metadata associated with the first packet to the second service to analyze or process the first packet and the first metadata in conjunction with the first service; process at least one of the first packet or the first metadata in the second service based on external bytecode and generating at least second metadata based on the processing; receive second metadata to the first service; process the first packet or a second packet in the first service according to the second metadata.

Example Embodiments

Maintaining networks and network security in a heterogeneous environment can be an intricate and challenging task due to the diverse mix of operating systems, devices, applications, and protocols involved. Heterogeneous environments often consist of various operating systems (OS) such as Windows, macOS, Linux, and mobile platforms, and some of these are executed on different processor architectures that have different strengths and weaknesses. Each OS has unique security requirements, vulnerabilities, and update mechanisms. Managing patches, updates, and security configurations across these diverse platforms can be complex and time-consuming, leaving potential security gaps if not done diligently.

In addition, heterogeneous environments (e.g., different devices and applications) may not seamlessly integrate or communicate with each other, leading to interoperability challenges. Configuring security policies that work consistently across various platforms and ensuring that all components adhere to security standards can be a daunting task. This can result in misconfigurations or oversights that malicious attackers may exploit.

Devices and software in a heterogeneous environment may have different security postures and levels of vulnerability. While one device may be well-maintained and up-to-date, another may be outdated and susceptible to known exploits. Maintaining a consistent security posture across all components requires an organization to prioritize limited resources based on risk assessment.

Crafting security policies that cater to the different needs and vulnerabilities of various platforms, applications, and systems of the enterprise is a complex undertaking. Balancing the need for stringent security measures with usability and functionality is a constant challenge in an evolving technical landscape. Security policies require a deep understanding of the nuances of each platform and the ability to adapt security measures accordingly.

Examples are described herein in the context of systems and methods for configuring network groups without software-based processing and management. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In some aspects, a runtime service is provided that executes in conjunction with a runtime engine that executes a complementary service. Examples of services include proxies, firewalls, gateways, and so forth. The runtime engine is configured to execute platform-agnostic instructions (e.g., WebAssembly bytecode) and perform bidirectional communication with the service. The runtime engine exposes functionality from layers 3 to 7. For example, the runtime engine can expose a standardized API for further control. The runtime engine is also platform agnostic. For example, the same WebAssembly bytecode can be executed by a proxy, a firewall, and other services. In one case, a logging technique can be standardized to create logs. The logs can then be annotated and may be used for training ML functions. In some cases, the runtime engines can also execute ML models trained based on standardized logging.

FIG. 1 is a conceptual network diagram that illustrates various services and operations for controlling and monitoring network operations in accordance with some aspects of the disclosure. In some aspects, the network diagram illustrates various network services that may be used in various operations when clients 102 access different data sources through a network 100. Non-limiting examples of data sources include a private cloud 150 or accessing a private data center 160. Data sources can include other types of resources, such as different applications or other network functionality. Each client 102 may request to access the data sources through edge devices 104 to enter the network.

Network requests (or data) that enter the network 100 are subject to one or more services such as filtering, throttling, forwarding, and other network control mechanisms using one or more services. For example, zero-trust network access (ZTNA) proxy 110 operates on the principle of never trust, always verify. Conventional security approaches include perimeter defenses that assume data is trusted once past the initial barriers of the network (e.g., a firewall). In a ZTNA network access architecture, trust is never assumed regardless of whether the client device (e.g., the client 102) is inside or outside the network 100. Instead, continuous verification and authentication are enforced by the network 100 to ensure that only authorized entities gain access to resources. This approach enhances security by reducing the attack surface, improving visibility into network activity, and enabling more fine-grained access control. ZTNA is especially relevant due to the proliferation of mobile devices and device-agnostic policies, where remote work and the proliferation of devices make traditional security models increasingly inadequate.

The network requests (or data) may be interconnected with various functions, services, or servers based on an interconnect 120 for routing data according to different policies and configurations. Non-limiting examples of functions, services, and servers include a data loss prevention (DLP) 130, a virtual private network 132, a cloud-aware security broker (CASB) 134, a cloud distribute firewall (CDFW) 136, web application firewall (WAF) 138, a secure web appliance (WSA) 140, a DNS 142, a NGFW 144, and a secure web gateway (SWG) 146.

In some aspects, the DLP 130 is configured to analyze outbound web traffic inline and out-of-band to provide unified control over sensitive data leaving your organization. The CASB 134 enables security policy decisions at the network level to prevent malware spread and detonation, limit data exposure and exfiltration in cloud applications, and prevent data loss. The CDFW 136 is a network-distributed firewall that enables direct internet access for remote workers instead of backhauling traffic to the datacenter. In some cases, a web application firewall (WAF) may be implemented to protect web applications from a variety of online threats and attacks. The WAF 138 analyzes incoming hypertext transfer protocol (HTTP) traffic to identify and block malicious requests or patterns, such as SQL injection, cross-site scripting (XSS), and other application-layer attacks.

In some cases, the network 100 may include the NGFW 144 for enhanced security that extends conventional firewalls by integrating additional security features and providing more granular control over network traffic. For example, an NGFW may include additional functionality such as application awareness to differentiate between different applications, user identity tracking, intrusion prevention systems for analyzing known attack patterns, deep packet inspection to identify malicious content, and threat intelligence integration feeds that provide information on new threats and issues. The SWG 146 filters and inspects traffic, and scrutinizes web traffic for malicious content, malware, phishing attempts, and other threats in real-time.

Each network 100 is different and adding services and configurations creates a complex security environment that is difficult to maintain. The systems and techniques below provide additional instrumentation using a platform-agnostic bytecode to enable maintaining a consistent network security posture and reduce time to update and maintain the various services. In some aspects, a runtime engine may be configured to integrate with the various services described above and implement interfaces to enable controlling services with a bidirectional interface using bytecode instructions. For example, a runtime engine abstracts an additional layer that is common to each of the various network services in the network 100 and uses a platform-agnostic plugin architecture to supplement functionality. A market may be configured to enable public or private sharing of different plugin applications. In addition, the bytecode can be used to extend functionality to an existing service to add unsupported features.

Figure 2:
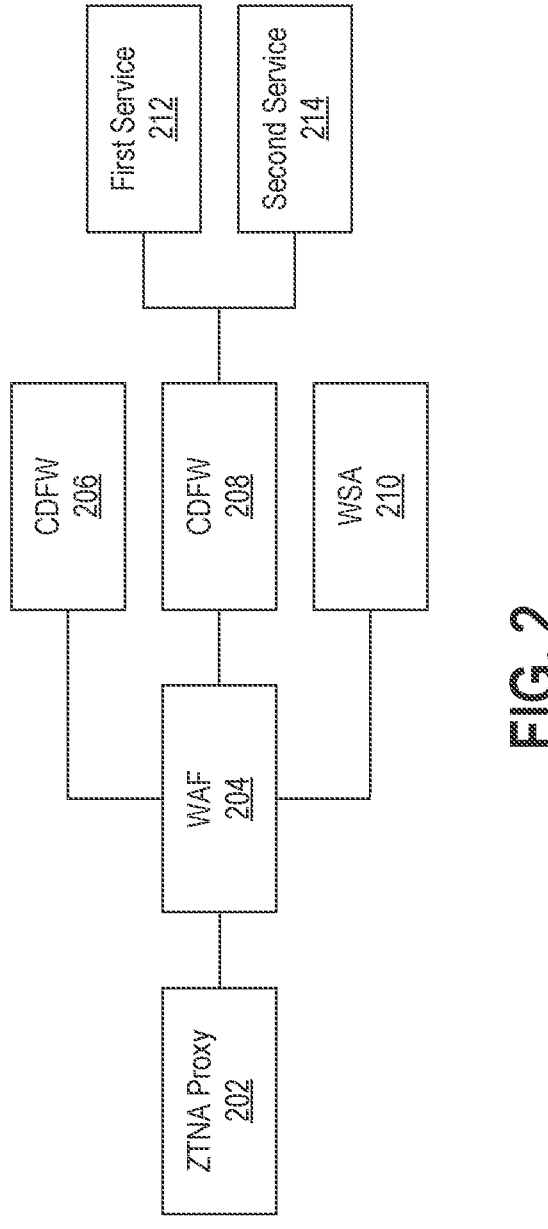
FIG. 2 is an illustration of a network path associated with different requests and the different services associated with different services in accordance with some aspects of the disclosure.

FIG. 2 is an illustration of a network path 200 associated with different requests and the different services associated with different services in accordance with some aspects of the disclosure.

In some aspects, a ZTNA proxy 202 is configured to receive all incoming requests and perform various configured functions on incoming requests. For example, the ZTNA proxy 202 serves as an intermediary between a client and a server, forwards requests from clients to servers, and returns responses from servers to clients. The primary function of a proxy is to enhance security, privacy, performance, and network efficiency. The ZTNA proxy 202 may be configured for additional functions such as anonymizing data and privacy, content filtering, caching, load balancing, security functions, network optimization, logging and monitoring, protocol conversion, and content modification. The ZTNA proxy 202 may also be configured as a reverse proxy and forward content to a different network path.

In the illustrated aspect, the ZTNA proxy 202 is configured to transmit and receive content from a WAF 204 that performs additional functions in connection with web-based applications and websites. For example, the WAF 204 is configured to perform traffic filtering (e.g., filtering XSS and SQL injection attacks), vulnerability protection, rate limiting, session protection, content filtering, geolocation-based blocking, SSL/TLS termination and inspection, bot protection, and logging and reporting functions.

As illustrated in FIG. 2, the WAF 204 may also be configured as a reverse proxy for other applications. For example, the WAF 204 may forward filter content and forward corresponding to different destinations such as a VPN 206, an NGFW 208, and a WSA 210. The illustration in FIG. 2 is an illustrative example to illustrate a potential configuration for the purpose of explanation and is not limiting to the scope of the disclosure. In this case, the VPN 206 is a secure and encrypted tunnel that enables users to establish a private and protected connection over a public network, such as the Internet, and access resources within a network entity. Accessing the VPN 206 requires authentication credentials to establish and ensure data confidentiality, integrity, and privacy by masking a user's IP address and encrypting their internet traffic to a user or service accessing the VPN 206.

The NGFW 208 is an advanced network security service that combines traditional firewall capabilities with additional, cutting-edge features for cloud-based and conventional network-based environments. The NGFW 208 provides comprehensive threat protection by inspecting and filtering network traffic at both the application and content levels and offers deep packet inspection, application awareness, and advanced security measures, including intrusion detection and prevention, antivirus, URL filtering, and identity-based access control. As illustrated in FIG. 2, the NGFW 208 may be configured to expose a first service 212 and a second service 214. For example, the first service 212 may be a web server configured to provide information to the public at large. The second service 214 may be another corresponding service, such as a file-sharing service, an intranet, or other type of service that may require credentials to access. In this case, the first service 212, and the second service 214 receive multiple layers of protective services with different devices. In this conventional configuration, changes downstream or upstream from the first service 212 and the second service 214 can have different effects that are not protected at design time. For example, if the first service 212 is reconfigured to use a different port, this change may affect other devices in the network path, such as how the NGFW 208 is configured.

The WSA 210 is configured to protect organizations from web-based threats and provide secure web access for users. The NGFW 208 may filter and monitor internet traffic, enforcing security policies and protecting against various online threats, including malware, phishing, and malicious websites.

The various services described in FIG. 2 have similar, but different and important distinctions. The various services can be configured in different manners and may employ fundamentally different configurations. For example, the second service 214 may be a Kubernetes cluster that isolates an application and its dependencies into a portable environment, which can then be deployed to dynamically scale across regions. In this case, updating the services across the network consistently is a fundamental concern because each service has different issues, different configurations, and different requirements. In addition, other services may be needed based on the network architecture, resource configuration, and other aspects. For example, the network may use different cloud services for functions and a CDFW (e.g., CDFW 136) may be required to provide firewall capabilities across distributed and interconnected cloud environments. In another example, a CASB (e.g., CASB 134) may be implemented to provide security policy decisions at the network level to prevent malware spread and detonation, limit data exposure and exfiltration in cloud applications, and prevent data loss.

Maintaining a consistent security posture with the different services is difficult, and additional complexities such as regulations, insurance requirements, and other adjacent issues further exacerbate the complexity of maintaining the different services.

Figure 3:
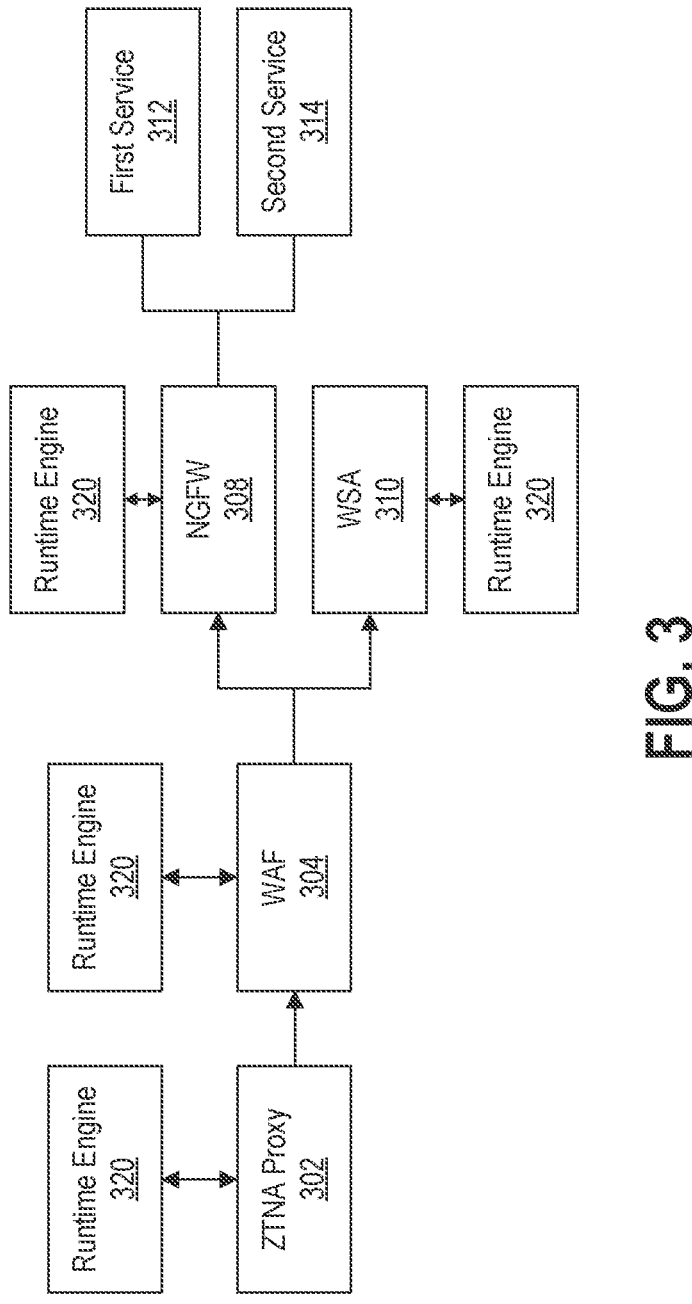
FIG. 3 is a conceptual diagram illustrating a network including one or more services configured to execute a bytecode-based extension for implementing heterogeneous network services using platform-agnostic extensions in accordance with some aspects of the disclosure.

FIG. 3 is a conceptual diagram illustrating a network including one or more services configured to execute platform agnostic extensions at different layers in accordance with some aspects of the disclosure. In the example of FIG. 3, the network 300 comprises a network architecture similar to FIG. 2 for purposes of illustration. For example, the network 300 includes a ZTNA proxy 302, a WAF 304, an NGFW 308 that protects a first service 312 and a second service 314, and a WSA 310.

In some aspects, each service is configured to include a runtime engine 320 that is configured to execute instructions in conjunction with each service. The runtime engine 320 is configured to interface with different services and execute additional software instructions in parallel or in series with each service. The runtime engine 320 is configured to interface with each service in a bidirectional manner to send and receive metadata from each service to control aspects of each service in a platform-agnostic manner. For example, the runtime engine 320 may include a virtual machine that executes WebAssembly (or WASM) bytecode instructions.

Web Assembly is a binary instruction format that enables high-performance execution of code and is a portable compilation target for programming languages, allowing developers to write code in various languages (e.g., C, C++, Rust, etc.) and others, and then compile the code into WebAssembly modules for execution within the runtime engine 320. WebAssembly provides near-native performance because instructions are modeled similar to machine-level instructions and use a linear memory. WebAssembly WebAssembly is based on a stack machine in that instructions manipulate values on an implicit operand stack, consuming (popping) argument values and producing or returning (pushing) result values. In addition to dynamic operands from the stack, some instructions also have static immediate arguments, typically indices or type annotations, which are part of the instruction itself. Other instructions are structured in that they bracket nested sequences of instructions.

For example, WebAssembly includes different types of instructions such as numeric instructions, vector or single instruction multiple data (SIMD) instructions, reference instructions, variable instructions, table instructions, memory instructions, and control flow instructions. The instructions are structured in a device-agnostic manner and include comment operations and details. For example, numeric instructions are divided by number type and constants that return a static constant, unary operations that consume one operand and produce one result of the respective type binary operations that consume two operands and produce one result of the respective type, tests that consume one operand of the respective type and produce a boolean integer result, comparisons that consume two operands of the respective type and produce a boolean integer result, and conversions consume a value of one type and produce a result of another. SIMD instructions provide basic operations over values of vector type include and includes constants, unary operations binary operations ternary operations, tests, shifts, splats, extract lanes, and replace lanes.

Webassembly also uses a linear memory and is statically typed. A WebAssembly runtime engine (which can also be referred to as a compiler) translates the code and decides if specific variables perform certain actions. These factors increase Webassembly speed to correspond to a native binary compiled for a specific processor architecture with minimal overhead. For example, equivalent JavaScript (interpreted in a virtual machine) can be 10-40 times slower than similar Rust code that is compiled into Webassembly.

In some aspects, the runtime engine 320 includes additional functionalities that interface with the different services (e.g., the ZTNA proxy 302, the WAF 304, the NGFW 308, and the WSA 310) in a consistent manner and surfaces an API to WebAssembly modules for interacting with the services in a bidirectional manner. The API can expose different functions to enable controls of layers 3 through 7 of the (Open Systems Interconnection) OSI model. For example, layer 3 is also known as the network layer and provides end-to-end routing and logical addressing for data packets as they traverse a network. The runtime engine 320 can expose API endpoints that allow routing (e.g., determining the best path for data packets to reach their destination across interconnected networks), logical addressing (e.g., identifying the source and destination of data packets based on logical addresses), and packet forwarding (e.g., encapsulating data into packets and adding routing information), fragmentation and reassembly (e.g., fragmenting or assembling packets for consistent behavior analysis), error handling (e.g., error detection and correction), and subnetting (e.g., dividing large IP address spaces into smaller, more manageable subnetworks).

In another example, the runtime engine 320 can expose functionality for layer 4 or the transport layer. Examples of functions of layer 4 include access to network protocols such as TCP and UDP to provide data integrity, reliability, and flow control. For example, the runtime engine 320 can include segmentation and reassembly, flow control (e.g., preventing congestion by controlling data transmission rates), error detection and correction, reliability, port multiplexing, and connection setup and termination (e.g., the three-way handshake to establish a TCP connection and the four-way handshake to terminate the TCP connection). The runtime engine 320 may also expose layer 7 or the application layer for user applications. For example, the runtime engine 320 may provide application services, encryption and security, session management, application-specific protocols (e.g., HTTP, SMTP, FTP, etc.), and remote procedure calls (RPCs). In some aspects, the runtime engine 320 can also be configured to execute machine learning models based on normalizing the generated ML models into WebAssembly instructions. For example, generated ML models can be optimized for parallel processing using SIMD instructions.

Figure 4:
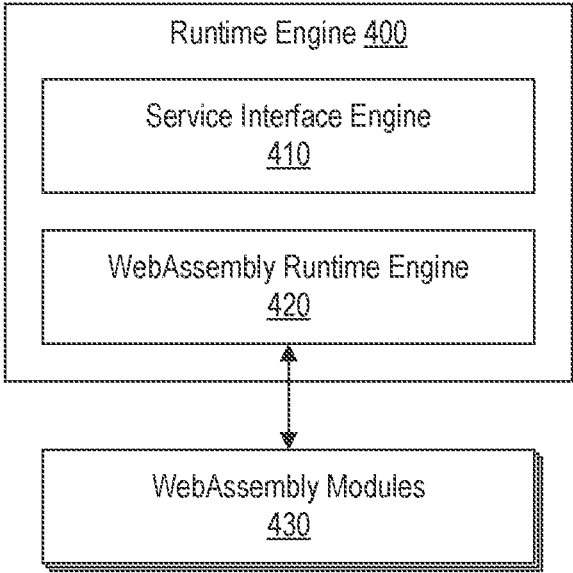
FIG. 4 illustrates a block diagram of a runtime engine 400 that is configured to interface with one or more external services in accordance with some aspects of the disclosure.

FIG. 4 illustrates a block diagram of a runtime engine 400 that is configured to interface with one or more external services in accordance with some aspects of the disclosure. The runtime engine 400 includes a service interface engine 410, a WebAssembly runtime engine 420, and one or more WebAssembly modules 430.

In some aspects, the WebAssembly runtime engine 420 may be an external runtime that is loaded by the runtime engine 400, or may be integral into the engine. For example, operating systems may include an integrated web engine that can be used to enable applications that are rendered by the integrated web engine. For example, some system applications in macOS® are rendered based on the React framework. In this case, the WebAssembly runtime engine 420 may be able to access the integrated WebAssembly engine within the operating system. In other cases, the Web Assembly runtime engine 420 may be an external library (e.g., Wasm Time, WasmEdge, etc.) or may be internal and compiled into the runtime engine 400.

The WebAssembly modules 430 are external modules that are loaded by the runtime engine 400 into the WebAssembly runtime engine 420 for execution in conjunction with the service interface engine 410. For example, the WebAssembly modules 430 may be compiled into instructions based on libraries exposed by the service interface engine 410. For example, the service interface engine 410 may provide an API for the WebAssembly modules 430 to access network layer protocols (e.g., TCP, UDP) and packet processing functions. The service interface engine 410 may provide an API for the WebAssembly modules 430 to access application layer protocols (e.g., HTTP).

In some aspects, the WebAssembly modules 430 are platform and service-agnostic. For example, the runtime engine 400 can be used to integrate with various services (e.g., a proxy such as Envoy or NGINX, a WAF such as ModSecurity, etc.) and execute the same code in the WebAssembly modules 430 irrespective of the service. The runtime engine 400 enables a single module to be integrated at different points within the network to enable custom services that increase security.

A non-limiting example of a WebAssembly module 430 is an encryption/decryption module that is configured to encrypt or decrypt network traffic at different points. For example, the encryption/decryption module can enable bypass of some content filtering functions because the only parties that are able to access the encryption/decryption module are known, trusted sources. Another non-limiting example of a WebAssembly module 430 is a DLP module that is configured to filter information to comply with regulatory requirements. For example, the HIPAA privacy rule protects all individually identifiable health information held or transmitted by a covered entity or its business associate, in any form or media. In this case, the DLP module may be configured to filter information in network packets that may uniquely identify information, such as a social security number or a driver's license number.

Figure 5:
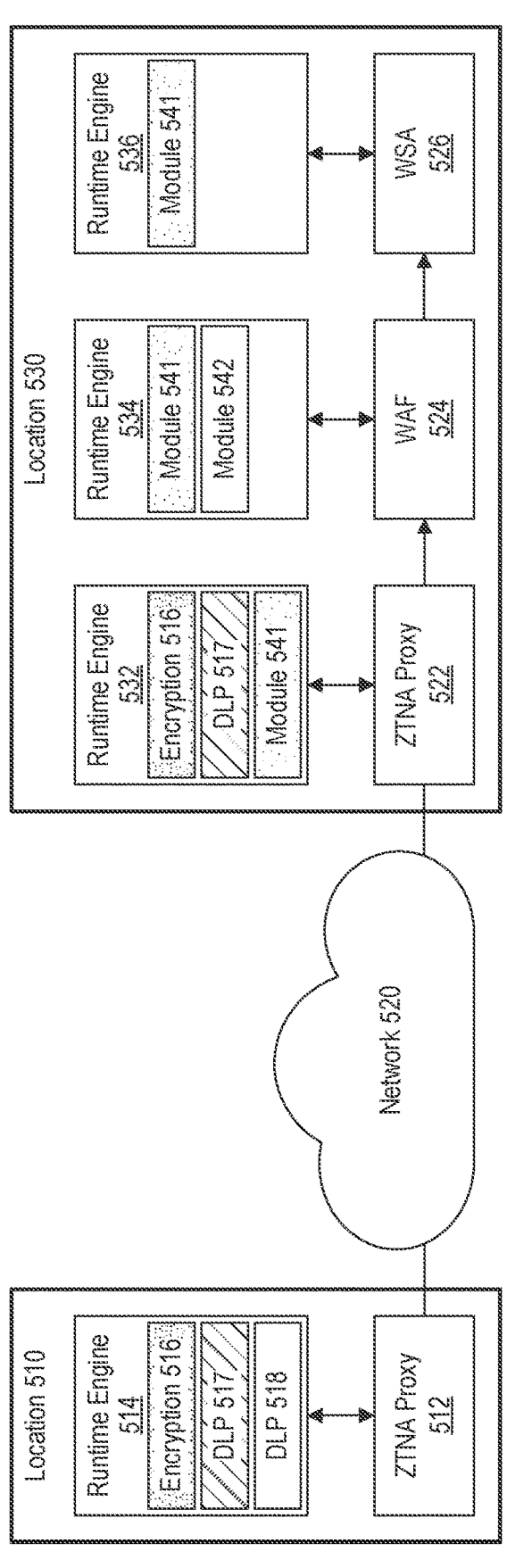
FIG. 5 is a conceptual example of implementing a network including one or more services configured to execute a bytecode-based extension at different layers in accordance with some aspects of the disclosure.

FIG. 5 is a conceptual diagram 500 illustrating a network including one or more services configured to execute a bytecode-based extension at different layers in accordance with some aspects of the disclosure. A first location 510 and a second location 530 are connected through a network 520 to integrate and perform various services. For example, the first location 510 may be a satellite office and a private network is configured using a ZTNA proxy 512 executing a runtime engine 514.

The second location 530 may include a ZTNA proxy 522, a WAF 524, and a WSA 526. The ZTNA proxy 522 also executes a runtime engine 532, the WAF 524 executes a runtime engine 534, and the WSA 526 executes a runtime engine 536. Each of the runtime engines may execute WebAssembly modules to enable a private network and perform other functions. For example, the runtime engine 514 is configured to execute an encryption module 516 and the runtime engine 532 is also configured to execute the same encryption module 516. For example, the encryption module 516 may be configured to encrypt/decrypt traffic using symmetric or asymmetric techniques. In some cases, the code associated with the encryption module 516 may be highly protected, and a symmetric key can be used to encrypt and decrypt data transmitted between the first location 510, and the second location 530. In effect, the encryption module 516 enables a simple private network to be configured.

In some aspects, the ZTNA proxy 512 may also execute a first DLP module 517, and a second DLP module 518 for illustrative purposes. The ZTNA proxy 522 at the second location 530 may also execute the DLP module 517 to ensure that traffic provided through the network 520 does not include sensitive information.

Each of the WAF 524 and the WSA 526 may also execute other modules. In this case, module 541 is executed by the ZTNA proxy 522, the WAF 524, and the WSA 526. For example, the module 541 may be configured to detect specific types of attacks at different points. For example, in the event a packet is decoded at the WSA 526 and includes malicious code, the module 541 can detect and prevent execution of the malicious code. In this case, the module 541 provides a single set of rules across different services and different platforms to perform security functions.

The various WebAssembly modules illustrated in FIG. 5 can be used to supplement services in a service-agnostic manner to improve security. In some cases, the WebAssembly provides a standardized mechanism for interfacing with different services to provide consistent monitoring, logging, security inspection, data handling, and other functions.

In some cases, the WebAssembly modules can also be a part of a platform that can be distributed to enable third parties to provide supplemental services. For example, the modules may be deployed onto a development and integration pipeline to allow a third party to deploy a module that can be adopted by any party. For example, an insurance company may develop a security module for execution in the runtime engine to monitor compliance with the insurance company's requirements.

An example of a marketplace can be a graphical user interface or a command line interface. A non-limiting example of a marketplace is a command line interface for adding and removing modules similar to a package manager. The command line interface can be used to add or remove modules in a static location and allow importing of the modules into other modules. For example, a command line interface may enable a module to be integrated into existing continuous integration/continuous deployment (CI/CD) pipelines to add and remove modules at runtime. In other cases, other infrastructure deployment tooling can be used (e.g., Terraform).

An example of a configuration of a WAF plugin used in conjunction with an envoy proxy is illustrated in Table 1. In the example configuration, the configuration identifies various types to make available, a first security rule for testing the runtime engine, a second security rule for rejecting a packet, information related to the service (e.g., the envoy proxy) to allow the WebAssembly module to connect and interact with the service, and the path and name of the bytecode.

TABLE 1

```
typed_config:
    @type: type.googleapis.com/upda.type.v1.TypedStruct
    type_url: type.googleapis.com/envoy.extensions.filters.http.wasm.v2.Wasm
    value:
        config:
            @type: "my_plugin"
            root_id: "my_root_id"
            configuration:
                @type: type.googleapis.com/google.protobuf.StringValue
                value: {
                    rules: "SecRuleEngine On
                        SecRule ARGS:param1 \"test\"
                        id: 1, phase: 1, pass, status: 200, msg: \"test rule\"
                        SecRule ARGS: param1 \"attack\"
                        id: 2, phase: 1, deny, status: 400, msg: \"test rule\"
                    }
                vm_config:
                    runtime: "envoy.wasm.runtime.v8"
                    vm_id: "my_vm_id"
                    code:
                        local:
                            filename: "/path/modsec.wasm"
    -name: enjoy.filters.http.router
```

For example, if an http request is made (e.g., "curl-X POST-I http://localhost:8000/post?param 1-attack", the WebAssembly module is configured to instruct the service to deny the http request with an HTTP status of 400, which closes the connection immediately and does not provide a response.

Table 2 illustrates another example

TABLE 2

```
typed_config:
   name: envoy.filters.http.wasm
   typed_config:
      type: type.googleapis.com/upda.type.v1.TypedStruct
      type_url: type.googleapis.com/envoy.extensions.filters.http.wasm.v2.Wasm
      value:
         config:
            configuration:
               @type: type.googleapis.com/google.protobuf.StringValue
               value: "body-set"
            vm_config:
               runtime: "envoy.wasm.runtime.v8"
               vm_id: "my_vm_id"
               code:
                  local:
                     filename: "/path/httpfilter.wasm"
            name: envoy.filters.http.router
            typed_config:
               @type: type.googleapis.com/envoy.extensions.filters.http.router.v3.Router
```

Table 2 illustrates another example of a DLP plugin that blocks requests based on access to sensitive information. For example, sending an HTTP request (e.g., curl localhost: 8000/senstiveurl may block the request and return an HTTP 403 forbidden response.

Figure 6:
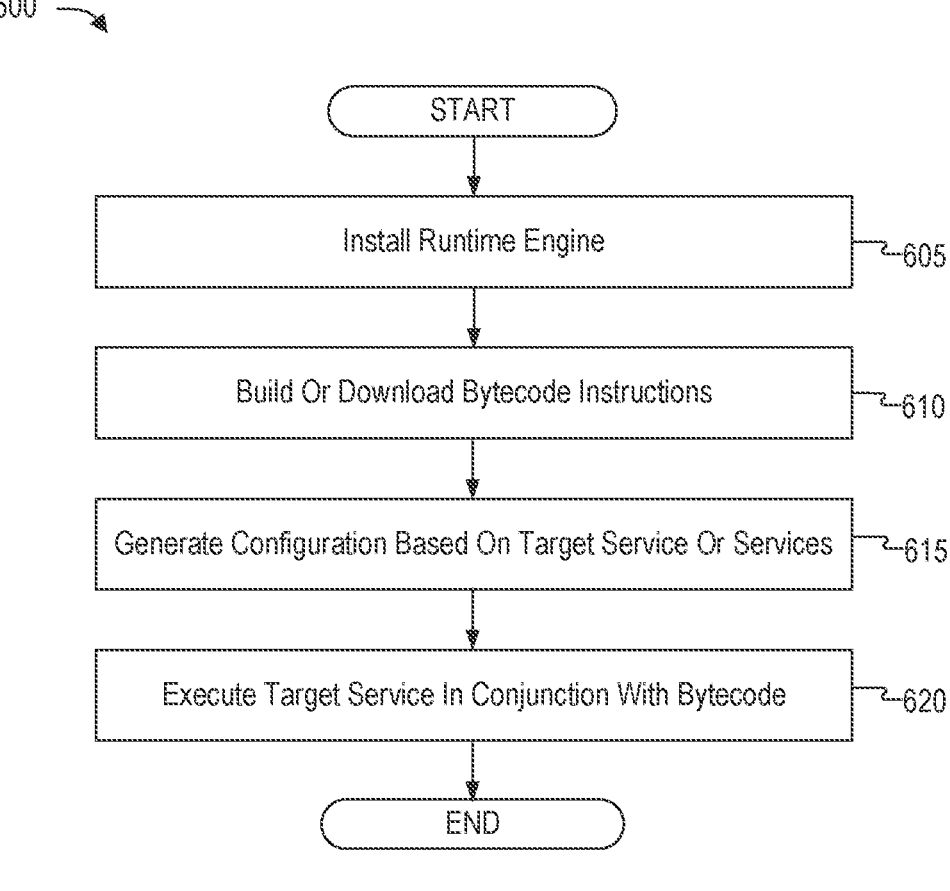
FIG. 6 is a flowchart of a process for configuring bytecode-based extensions in accordance with some aspects of the disclosure.

FIG. 6 is a flowchart of a process 600 for configuring bytecode-based extensions in accordance with some aspects of the disclosure. The process 600 begins with a user installation of the runtime engine that can support one or more target services of the system at block 605. At block 610, the user builds or downloads bytecode instructions associated with the runtime engine. For example, the user may use a command line interface to retrieve a package (e.g., wasmextender install hostServiceSecurityModule). In this example, the command (wasmextender) installs a security module associated with the host. In another example, the user may write instructions in one language (e.g., Rust, Typescript, etc.) and then compile the instructions into a WebAssembly bytecode module. In some cases, the user may import libraries associated with the runtime engine to access various functions from layer 3 to layer 7 described above).

At block 615, the user then generates a configuration for a target service or target services that identifies a relationship for invoking the runtime engine. Non-limiting target services include a proxy (e.g., Envoy, NGINX), a WAF (Mod-Security, etc.), an SMTP server, etc. An example relationship in a proxy server configuration can forward all traffic to the runtime engine for execution of the runtime engine either in series or in parallel. An example of a series configuration and a parallel configuration are further illustrated with reference to FIG. 7.

At block 620, the user then executes the target service. In some aspects, the loading of the target service can invoke an instance of the runtime engine to execute in conjunction with the target service.

Figure 7:
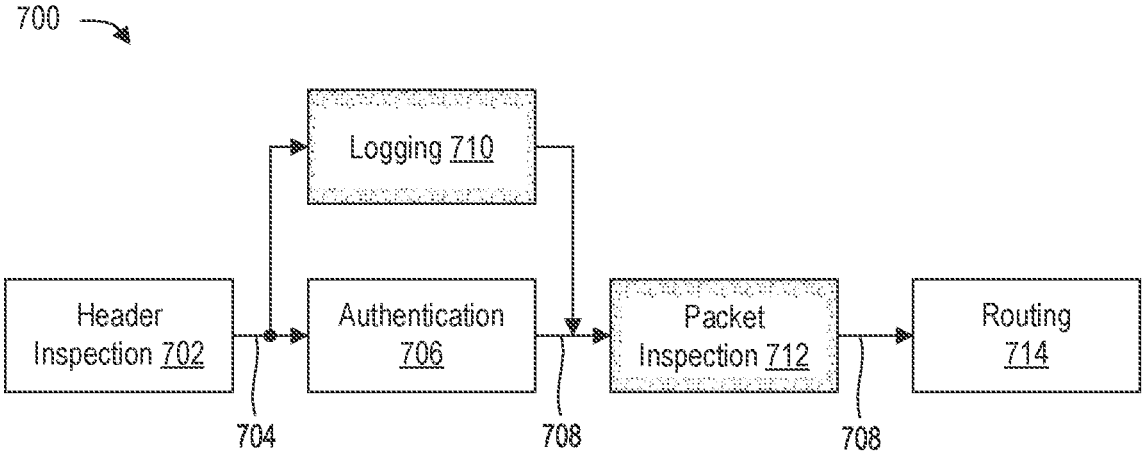
FIG. 7 is a conceptual example of a network function having multiple control points for implementing bytecode-based extensions in accordance with some aspects of the disclosure.

FIG. 7 is a conceptual example of a network function having multiple control points for implementing bytecode-based extensions in accordance with some aspects of the disclosure. In particular, FIG. 7 illustrates a processing pipeline 700 of a service (e.g., a proxy, a WAF, etc.) and includes multiple control points. As an example, a first control point 704 and second control point 708 are illustrated and represent different points at which functions can integrate into the service. For example, the control points can be addressed that can be monitored by the runtime engine to identify processing opportunities.

In one illustrative example, the processing pipeline 700 is a proxy server (e.g., Envoy) that receives and treats packets before forwarding packets to a destination. The proxy server includes a header inspection 702 function for processing and potentially rejecting packets with malformed headers. The first control point 704 occurs after the header inspection 702 and creates a parallel processing pipe to allow the processing pipeline 700 to process authentication information 706 to determine whether the packet is authorized to proceed. In parallel, a logging function 710 can be executed in the runtime engine. For example, the logging function 710 may be configured to produce a standardized log to improve security monitoring. For example, the logging function 710 can produce a cleaned and normalized dataset that can be provided to an ML training system to train an ML model to identify various issues of interest (e.g., malicious content, attacks, etc.).

In this case, the logging function 710 occurs in parallel with authorization, and results are provided to control point 708. The logging function 710 in this case performs a logging action and does not provide any data back into the processing pipeline 700. A packet inspection 712 may also be configured to intercept data at the control point 708. In this case, the packet inspection 712 can be related to various items, such as the detection of fraudulent and invalid security credentials. The results of the packet inspection are returned to control point 708. In this case, the packet inspection 712 is configured in series, and at control point 708 can inform the service to deny further processing of the packet. For example, the packet inspection 712 can drop the packet and prevent sending the packet to a routing function 714. The routing function may comprise identifying a destination (e.g., a reverse proxy).

In this case, the runtime engine performs parallel processing (e.g., the logging function 710) and series processing (the packet inspection 712) to enable fine-grained control of the packet. The runtime engine can also send and receive metadata associated with operations in the service. For example, the logging function 710 may receive information pertaining to the header from which the logging function can decide how to process the packet. The runtime can also send information into the service. For example, the packet inspection 712 may simply drop the packet and prevent further actions. In another example, the packet inspection 712 may send information to the service to deny the packet based on the inspection.

FIG. 8 illustrates an example method for heterogenous network services using platform-agnostic extensions. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence. Although a computing device (e.g., using the SoC 900, etc.) is described as performing the method, this example is for descriptive purposes. The method may be performed in a distributed manner using cloud computing, various containers, microservices, and other techniques.

At block 805, the computing device may instantiate a first service having a first data plane control point at block 805. In this case, a data plane corresponds to a processing path of a packet within the first service. For example, the control point can be an API endpoint, an API hook, or other technique to enable interoperation between the first service and the second service.

At block 810, the computing device may instantiate a second service configured to access the first control point in a data plane. In one example, the external bytecode comprises WebAssembly instructions. A runtime engine is configured to execute the external bytecode and operate as the second service. In this case, the second service is created based on instructions by the external bytecode.

In some aspects, the runtime engine comprises a first interface for controlling network requests associated with the first service, a second interface controlling network protocols associated with a data plane, and a third interface controlling network routing functions. For example, the first interface enables layer 7 functions, the second interface enables layer 4 functions, and the third interface enables layer 3 functions. Layers 5 and 6 can also have interfaces. For example, the third interface controls network protocols associated with an application plane, and the second interface controls network protocols associated with the data plane, and third interface controlling network routing functions.

At block 815, the computing system may receive a first packet at the first service in a network path. In this case, the network path corresponds to the route that the packet is traversing and is provided to the computing system. The computing system may at least partially process the first packet at block 815. For example, the computing system may extract (e.g., read) first metadata from the packet or generate first metadata from the packet.

At block 820, the computing system may provide at least one of the first packet and first metadata associated with the first packet to the second service to analyze or process the first packet and the first metadata in conjunction with the first service. In one example of block 820, the computing system may, when a trigger is identified based on a first control point, provide the first packet and the first metadata to the second service. The control point is a point within the first service at which the second service interoperate with the first service. For example, specific endpoints of an API can be interfaced with. In other cases, the control points can be specified in a configuration file, or other type of metadata for configuring the first service.

At block 825, the computing system may process at least one of the first packet or the first metadata in the second service based on external bytecode and generate at least second metadata based on the processing. Non-limiting examples of processing the first packet or metadata include dropping the first packet to prevent further transmission of the first packet, inspecting and filtering data within the first packet to generate the second packet, modifying headers within the first packet to generate the second packet, performing a control plane function based on headers or data within the first packet (e.g. logging), controlling a session with a counterpart device through a network, controlling at least one network protocol in the data plane, or controlling network routing functions. Other types of processing are within the scope of the disclosure.

At block 830, the computing system may, at the first service, receive second metadata from the second service. For example, the first service can receive information to drop the packet, rate limit the packet, or other type of processing.

At block 835, the computing system may process the first packet or a second packet in the first service according to the second metadata.

In some other aspects, the computing system can also include a third service that executes the same bytecode to create a fourth service. For example, the computing system may instantiate a third service having at least one data plane control point and instantiate a fourth service configured to access a second data plane control point. In this case, the fourth service is provided based on instructions in the external bytecode. The third service may receive the first packet or the second packet from the first service after being processed according to the second metadata. For example, the first packet may be modified into the second packet based on changes by the second service. The third service may be configured to process the first packet or the second packet in the third service according to the third metadata generated by the fourth service. For example, the third metadata may indicate to drop the packet. In another example, the fourth service may create a replacement packet. In this case, the first service is different from the third service. For example, the first service is a proxy, and the third service is a firewall.

In some aspects, the process illustrated in FIG. 8 may be implemented by various devices. In some aspects, the process is implemented in an SoC that may be implemented in various networking devices (e.g., network controllers, network switches, etc.) in various configurations. The process may also be implemented by a device that needs to securely bootstrap software instructions, such as a mobile device, a laptop, a medical device, etc.

Figure 9:
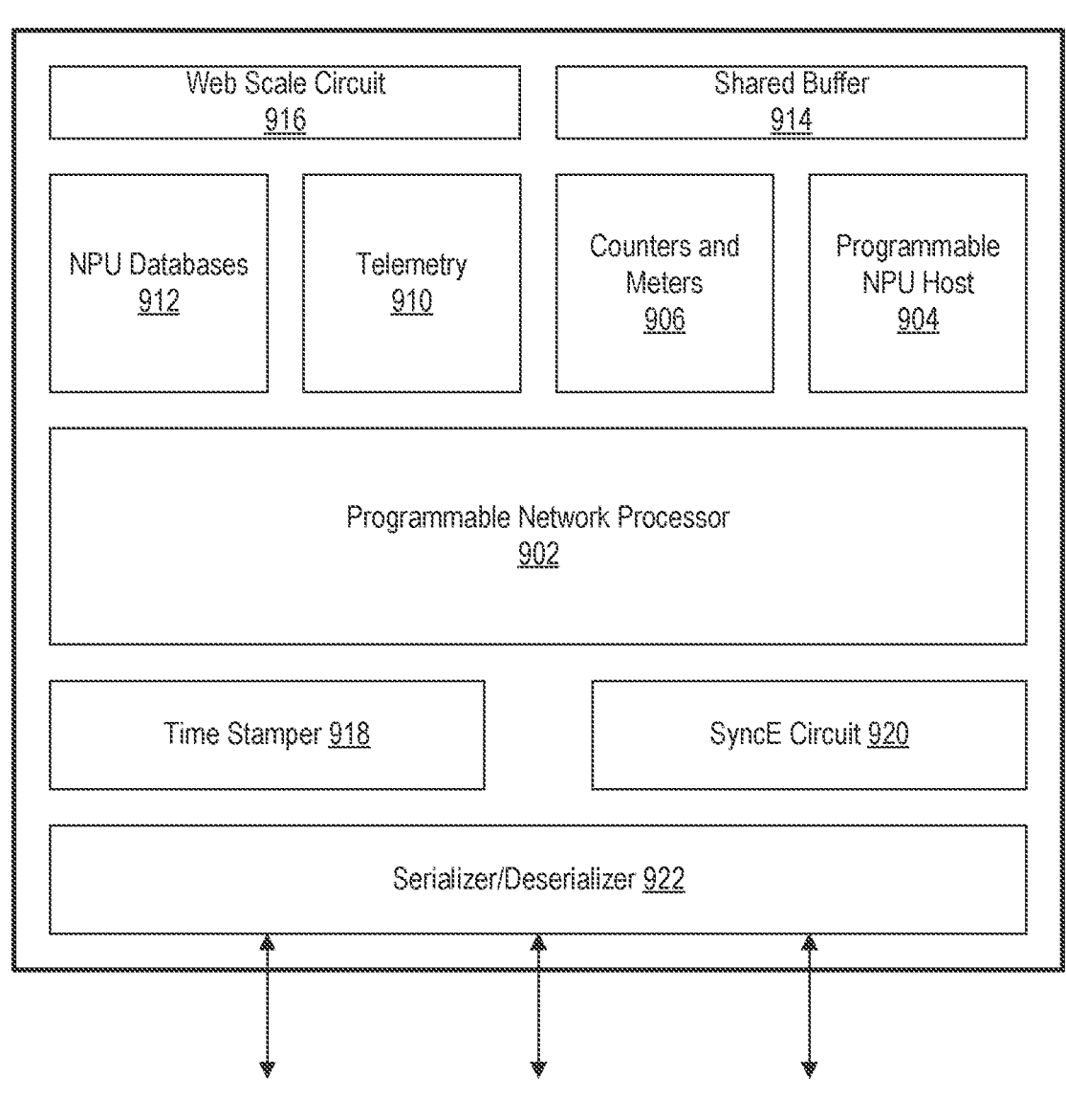
FIG. 9 illustrates a block diagram of an SoC used in a network device to perform various functions in hardware in accordance with various aspects of the disclosure.

FIG. 9 illustrates a block diagram of an SoC 900 used in a network device to perform various functions in hardware in accordance with various aspects of the disclosure. For example, the SoC 900 may include fixed hardware components and programmable hardware components to perform various network tasks. In one illustrative aspect, the SoC 900 includes a programmable network processor 902 (e.g., an NPU, etc.), a programmable NPU host 904, counters and meters 906, telemetry 910, an NPU database 912, a shared buffer 914, a web scale circuit 916, a time stamper 918, a synchronous Ethernet (SyncE) circuit 920, and a serializer/deserializer 922. In some cases, the SoC 900 may be configured to execute bytecode instructions to be supplemented with additional functions. For example, the SoC 900 may be configured to execute various functions described above.

The programmable network processor 902 may be programmed to perform functions that are conventionally performed by integrated circuits (IC) that are specific to switching, routing line card, and routing fabric. The programmable network processor 902 may be programmable using the programming protocol-independent packet processors (P4) language, which is a domain-specific programming language for network devices for processing packets. The programmable network processor 902 may have a distributed P4 NPU architecture that may execute at a line rate for small packets with complex processing. The programmable network processor 902 may also include optimized and shared NPU fungible tables. In some aspects, the programmable network processor 902 supports a unified software development kit (SDK) to provide consistent integrations across different network infrastructures and simplifies networking deployments. The SoC 900 may also include embedded processors to offload various processes, such as asynchronous computations.

The programmable network processor 902 includes a programmable NPU host 904 that may be configured to perform various management tasks, such as exception processing and control-plane functionality. In one aspect, the programmable NPU host 904 may be configured to perform high-bandwidth offline packet processing such as for example, operations, administration, and management (OAM) processing and media access control (MAC) learning.

The SoC 900 includes counters and meters 906 for traffic policing, coloring, and monitoring. As an example, the counters and meters 906 include programmable counters used for flow statistics and OAM loss measurements. The programmable counters may also be used for port utilization, microburst detection, delay measurements, flow tracking, elephant flow detection, congestion tracking, etc.

The telemetry 910 is configured to provide in-band telemetry information such as per-hop granular data in the forwarding plane. The telemetry 910 may observe changes in flow patterns caused by microbursts, packet transmission delay, latency per node, and new ports in flow paths. The NPU database 912 provides data storage for one or more devices, for example, the programmable network processor 902 and the programmable NPU host 904. The NPU database 912 may include different types of storage, such as key-value pair, block storage, etc.

In some aspects, the SoC 900 includes a shared buffer 914 that may be configured to buffer data, configurations, packets, and other content. The shared buffer 914 may be utilized by various components such as the programmable network processor 902 and the programmable NPU host 904. A web scale circuit 916 may be configured to dynamically allocate resources within the SoC 900 for scale, reliability, consistency, fault tolerance, etc.

In some aspects, the SoC 900 may also include a time of day (ToD) time stamper 918 and a SyncE circuit 920 for distributing a reference to subordinate devices. For example, the time stamper 918 may support IEEE-1588 for ToD functions. In some aspects, the time stamper 918 includes support for a precision timing protocol (PTP) for distributing frequency and/or phase to enable subordinate devices to synchronize with the SoC 900 for nano-second level accuracy.

The serializer/deserializer 922 is configured to serialize and deserialize packets into electrical signals and data. In one aspect, the serializer/deserializer 922 supports sending and receiving data using non-return-to-zero (NRZ) modulation or pulse amplitude modulation 4-level (PAM4) modulation. In one illustrative aspect, the hardware components of the SoC 900 provide features for terabit-level performance based on flexible port configuration, nanosecond-level timing, and programmable features. Non-limiting examples of hardware functions that the SoC 900 may support include internet protocol (IP) tunneling, multicast, network address translation (NAT), port address translation (PAT), security and quality of service (QOS) access control lists (ACLs), equal cost multiple path (ECMP), congestion management, distributed denial of service (DDos) migration using control plane policing, telemetry, timing and frequency synchronization, and so forth.

Figure 10:
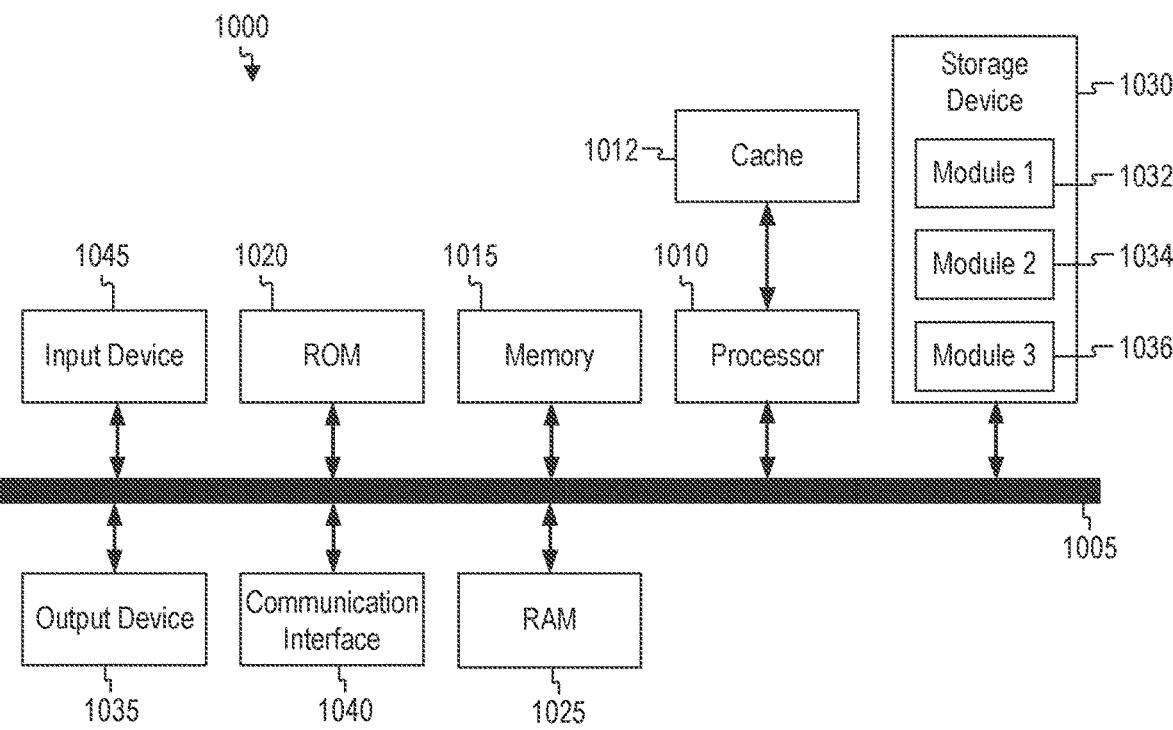
FIG. 10 shows an example of a computing system, which may be for example any computing device that may implement components of the system.

FIG. 10 shows an example of computing system 1000, which may be for example any computing device making up the various roles described above or any component thereof in which the components of the system are in communication with each other using connection 1005. Connection 1005 may be a physical connection via a bus, or a direct connection to processor 1010, such as in a chipset architecture. Connection 1005 may also be a virtual connection, networked connection, or logical connection.

In some embodiments, computing system 1000 is a distributed system in which the functions described in this disclosure may be distributed within a datacenter, multiple datacenters, a peer network, etc. In some embodiments, one or more of the described system components represents many such components each performing some or all of the function for which the component is described. In some embodiments, the components may be physical or virtual devices.

Example system 1000 includes at least one processing unit (CPU or processor) 1010 and connection 1005 that couples various system components including system memory 1015, such as ROM 1020 and RAM 1025 to processor 1010. Computing system 1000 may include a cache of high-speed memory 1012 connected directly with, in close proximity to, or integrated as part of processor 1010.

Processor 1010 may include any general purpose processor and a hardware service or software service, such as services 1032, 1034, and 1036 stored in storage device 1030, configured to control the processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms known to those of skill in the art. In some instances, multimodal systems may enable a user to provide multiple types of input/output to communicate with computing system 1000. Computing system 1000 may include communications interface 1040, which may generally govern and manage the user input and system output. There is no restriction on operating on any particular hardware arrangement and therefore the basic features here may easily be substituted for improved hardware or firmware arrangements as they are developed.

Storage device 1030 may be a non-volatile memory device and may be a hard disk or other types of computer readable media which may store data that are accessible by a computer, such as magnetic cassettes, flash memory cards, solid state memory devices, digital versatile disks, cartridges, RAM, ROM, and/or some combination of these devices.

The storage device 1030 may include software services, servers, services, etc., that when the code that defines such software is executed by the processor 1010, it causes the system to perform a function. In some embodiments, a hardware service that performs a particular function may include the software component stored in a computer-readable medium in connection with the necessary hardware components, such as processor 1010, connection 1005, output device 1035, etc., to carry out the function.

Devices implementing methods according to these disclosures may comprise hardware, firmware and/or software, and may take any of a variety of form factors. Typical examples of such form factors include servers, laptops, smart phones, small form factor personal computers, personal digital assistants, and so on. Functionality described herein also may be embodied in peripherals or add-in cards. Such functionality may also be implemented on a circuit board among different chips or different processes executing in a single device, by way of further example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service may be software that resides in memory of a client device and/or one or more servers of a content management system and perform one or more functions when a processor executes the software associated with the service. In some embodiments, a service is a program, or a collection of programs that carry out a specific function. In some embodiments, a service may be considered a server. The memory may be a non-transitory computer-readable medium.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data which cause or otherwise configure a general-purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smartphones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

What is claimed is:

1. A method comprising:

instantiating a first service having a first data plane control point;

instantiating a second service configured to access the first data plane control point in a data plane, the second service being provided based on instructions by an external bytecode;

receiving a first packet at the first service in a network path;

providing at least one of the first packet and first metadata associated with the first packet to the second service to analyze or process the first packet and the first metadata in conjunction with the first service;

processing at least one of the first packet or the first metadata in the second service based on the external bytecode and generating second metadata based on the processing;

receiving the second metadata to the first service; and processing the first packet or a second packet in the first service according to the second metadata, wherein the second service comprises a runtime engine that executes the external bytecode in a virtual machine and exposes, a plurality of host interfaces including a first interface for controlling network requests associated with the first service, a second interface controlling network protocols associated with the data plane, and a third interface controlling network routing functions.

2. The method of claim 1, further comprising:

at least partially processing the first packet in the first service, wherein the first metadata is extracted from the first packet or generated during the processing of the first packet;

when a trigger is identified based on the first data plane control point, providing the first packet and the first metadata to the second service; and receiving the second packet from the second service.

3. The method of claim 1, wherein the processing of the first packet comprises at least one of:

dropping the first packet to prevent further transmission of the first packet;

inspecting and filtering data within the first packet to generate the second packet;

modifying headers within the first packet to generate the second packet;

performing a control plane function based on headers or data within the first packet;

controlling a session with a counterpart device through a network;

controlling at least one network protocol in the data plane; and controlling network routing functions.

4. The method of claim 1, further comprising:

instantiating a third service having at least one data plane control point;

instantiating a fourth service configured to access a second data plane control point, the fourth service being provided based on instructions by a second external bytecode;

receiving the first packet or the second packet from the first service after being processed according to the second metadata; and processing the first packet or the second packet in the third service according to third metadata generated by the fourth service.

5. The method of claim 1, wherein a runtime engine is configured to verify a cryptographic signature of the external bytecode prior to execution, maintain a revocation list of disallowed modules, and deny execution of unsigned or revoked modules.

6. The method of claim 5, wherein the external bytecode comprises webassembly instructions conforming to a Proxy-Wasm compatible interface.

7. The method of claim 5, wherein the runtime engine comprises the first interface, the second interface, and the third interface are invocable exclusively via a defined application binary interface (ABI) that restricts the module to pre-authorized host calls.

8. A computing system comprising:

a storage configured to store instructions; and a processor configured to execute the instructions and cause the processor to:

instantiate a first service having a first data plane control point;

instantiate a second service configured to access the first data plane control point in a data plane, the second service being provided based on instructions by an external bytecode;

receive a first packet at the first service in a network path;

provide at least one of the first packet and first metadata associated with the first packet to the second service to analyze or process the first packet and the first metadata in conjunction with the first service;

process at least one of the first packet or the first metadata in the second service based on the external bytecode and generating at least second metadata based on the processing;

receive second metadata to the first service; and process the first packet or a second packet in the first service according to the second metadata, wherein the second service comprises a runtime engine that executes the external bytecode in a virtual machine and exposes, a plurality of host interfaces including a first interface for controlling network requests associated with the first service, a second interface controlling network protocols associated with the data plane, and a third interface controlling network routing functions.

9. The computing system of claim 8, wherein the processor is configured to execute the instructions and cause the processor to:

at least partially process the first packet in the first service, wherein the first metadata is extracted from the first packet or generated during the processing of the first packet;

when a trigger is identified based on the first data plane control point, provide the first packet and the first metadata to the second service; and receive the second packet from the second service.

10. The computing system of claim 8, wherein, when the processor processes the first packet or the second packet, the processor is configured to execute the instructions and cause the processor to:

drop the first packet to prevent further transmission of the first packet;

inspect and filtering data within the first packet to generate the second packet;

modify headers within the first packet to generate the second packet;

perform a control plane function based on headers or data within the first packet;

control a session with a counterpart device through a network;

control at least one network protocol in the data plane; or control network routing functions.

11. The computing system of claim 8, wherein the processor is configured to execute the instructions and cause the processor to:

instantiate a third service having at least one data plane control point;

instantiate a fourth service configured to access a second data plane control point, the fourth service being provided based on instructions by a second external bytecode;

receive the first packet or the second packet from the first service after being processed according to the second metadata; and process the first packet or the second packet in the third service according to third metadata generated by the fourth service.

12. The computing system of claim 8, wherein a runtime engine is configured to verify a cryptographic signature of the external bytecode prior to execution, maintain a revocation list of disallowed modules, and deny execution of unsigned or revoked modules.

13. The computing system of claim 12, wherein the external bytecode comprises webassembly instructions conforming to a Proxy-Wasm compatible interface.

14. The computing system of claim 12, wherein the first interface, the second interface, and the third interface are invocable exclusively via a defined application binary interface (ABI) that restricts the module to pre-authorized host calls.

15. An integrated circuit comprising instructions comprising a programmable circuit in the integrated circuit and configured to:

instantiate a first service having a first data plane control point;

instantiate a second service configured to access the first data plane control point in a data plane, the second service being provided based on instructions by an external bytecode;

receive a first packet at the first service in a network path;

provide at least one of the first packet and first metadata associated with the first packet to the second service to analyze or process the first packet and the first metadata in conjunction with the first service;

process at least one of the first packet or the first metadata in the second service based on the external bytecode and generating at least second metadata based on the processing;

receive second metadata to the first service; and process the first packet or a second packet in the first service according to the second metadata, wherein the second service comprises a runtime engine that executes the external bytecode in a virtual machine and exposes, a plurality of host interfaces including a first interface for controlling network requests associated with the first service, a second interface controlling network protocols associated with the data plane, and a third interface controlling network routing functions.

16. The integrated circuit of claim 15, wherein the integrated circuit further comprises instructions that, when executed by the programmable circuit, cause the integrated circuit to:

at least partially process the first packet in the first service, wherein the first metadata is extracted from the first packet or generated during the processing of the first packet;

when a trigger is identified based on the first data plane control point, provide the first packet and the first metadata to the second service; and receive the second packet from the second service.

17. The integrated circuit of claim 15, wherein the integrated circuit further comprises instructions that, when executed by the programmable circuit to process of the first packet, cause the integrated circuit to:

drop the first packet to prevent further transmission of the first packet;

inspect and filtering data within the first packet to generate the second packet;

modify headers within the first packet to generate the second packet;

perform a control plane function based on headers or data within the first packet;

control a session with a counterpart device through a network;

control at least one network protocol in the data plane; or control network routing functions.

18. The integrated circuit of claim 15, wherein the integrated circuit further comprises instructions that, when executed by the programmable circuit in the integrated circuit, cause the integrated circuit to:

instantiate a third service having at least one data plane control point;

instantiate a fourth service configured to access a second data plane control point, the fourth service being provided based on instructions by the external bytecode;

receive the first packet or the second packet from the first service after being processed according to the second metadata; and process the first packet or the second packet in the third service according to third metadata generated by the fourth service.

19. The integrated circuit of claim 15, wherein a runtime engine executing in the programmable circuit is configured to verify a cryptographic signature of the external bytecode prior to execution, maintain a revocation list of disallowed modules, and deny execution of unsigned or revoked modules.

20. The integrated circuit of claim 19, wherein the external bytecode comprises webassembly instructions conforming to a Proxy-Wasm compatible interface.

* * * * *